US005609938A

United States Patent [19]

Shields

[11] Patent Number: 5,609,938

[45] Date of Patent: Mar. 11, 1997

[54] IMAGE DISPLAY APPARATUS WITH HOLES FOR OPPOSITE SIDE VIEWING

[75] Inventor: Rodney M. Shields, Lafayette, Calif.

[73] Assignee: Creative Minds Foundation, Inc., Wilmington, Del.

[21] Appl. No.: 324,889

[22] Filed: Oct. 18, 1994

Related U.S. Application Data

[63] Continuation-in-part of Ser. No. 81,728, Jun. 23, 1993, abandoned.

[51] Int. Cl.[6] .......... B32B 3/24

[52] U.S. Cl. .......... 428/138; 428/131; 428/137; 428/195; 428/201; 428/203; 428/204; 428/918; 428/913; 428/38; 428/41.8; 428/42.1; 359/839; 359/594; 359/601; 40/219; 427/243

[58] Field of Search .......... 428/131, 137, 428/195, 201, 203, 204, 918, 913, 38, 138, 41.8, 42.1; 427/243; 359/839, 594, 601; 40/219

[56] References Cited

U.S. PATENT DOCUMENTS

| | | | |
|---|---|---|---|
| 728,063 | 5/1903 | Wilson | 359/839 |
| 809,698 | 1/1906 | Kelley | 359/839 |
| 1,199,882 | 10/1916 | Frey | 359/839 |
| 3,451,877 | 6/1969 | Herschman | 161/3 |
| 3,853,675 | 12/1974 | Edwards | 161/3 |
| 4,261,649 | 4/1981 | Richard | 350/276 R |
| 4,321,778 | 3/1982 | Whitehead | 52/397 |
| 4,358,488 | 11/1982 | Duncklin et al. | 428/31 |
| 4,673,609 | 6/1987 | Hill | 428/187 |
| 4,925,705 | 5/1990 | Hill | 427/259 |
| 4,940,622 | 7/1990 | Leavitt, Sr. | 428/137 |

FOREIGN PATENT DOCUMENTS

| | | |
|---|---|---|
| 51-86049 | 2/1976 | Japan . |
| 54-93255 | 2/1979 | Japan . |
| 44089 | 2/1992 | Japan . |
| 2118096 | 10/1983 | United Kingdom . |

OTHER PUBLICATIONS

Smith, Turk, "Screen Acts Like A Mirror", *The Arizona Republic,* p. 10–E, Mar. 8, 1979. Phoenix, Arizona.

Shadow Screen Co., Inc. Catalog, Month Unknown 1979, Phoenix, Arizona.

American Scenics Catalog, ©Month Unknown 1979.

Advertising for 3M–France One–Way Vision Film, Month Unknown 1988.

DECO ADER Product Brochure for Perforated One–Way Vision Self–adhesive Panel Assembly, France, publication date circa month unknown 1980.

*Primary Examiner*—William Watkins

*Attorney, Agent, or Firm*—Thomas C. Feix

[57] ABSTRACT

One or more panels define a support for an image layer and a relatively dark layer. Holes extend through the panel and the layer. The holes allow viewing through the panels in one direction without seeing the image, yet the image can be viewed by looking at the panel assembly from the opposite direction. Thus, the image is suitable as an advertising medium as applied to the transparent windows of buildings, vehicles and the like. A person sitting in a building or in a vehicle cannot see the image on a window by looking outwardly through the window. Looking in the opposite direction, from outside to inside the vehicle, a person will see the image through the assembly of panels.

7 Claims, 7 Drawing Sheets

IMAGE DISPLAY APPARATUS WITH HOLES FOR OPPOSITE SIDE VIEWING

CROSS REFERENCES TO RELATED U.S. APPLICATIONS

This is a continuation-in-part of application(s) Ser. No. 08/081,728 filed on Jun. 23, 1993 abandoned.

This application is a continuation in part of co-pending application Ser. No. 08/081,728 filed Jun. 23, 1993 abandoned and entitled "Image Display Apparatus With Holes For Opposite Side Viewing", Rodney Shields, inventor.

FIELD OF THE INVENTION

This invention relates to improvements in the display of images of various types for different purposes, such as for advertising purposes and, more particularly, to an assembly of panels having a see-through capability and which are arranged to allow viewing of an image when looking in one direction but are arranged to prevent the viewing of the image when looking in the opposite direction. The control of the way in which the image can be viewed can be achieved by the proper positioning of the panels with respect to each other.

BACKGROUND OF THE INVENTION in advertising practices, it is desirable to utilize the surfaces of a transparent display medium, such as the interior or exterior surfaces of a window of a building, bus, streetcar, truck and the like, to support films or panels which have images on them to be displayed. Generally, the panels having the displays block any view through the window or surface, be it transparent or otherwise, on which the panel is placed. Thus, on a bus for instance, any panel having an image thereon which is viewable from a location outside the bus will block the view of the person sitting in the bus looking outwardly through a window. This is an objectional feature of images applied to panels and which are secured by adhesive or otherwise to the outer surface of a window. Such image-laden panels are rarely used.

Typically, only refrigeration doors of supermarkets and the like use panels of this type since the panels themselves are transparent and the images on the panels usually are in color. There is no need to have any more than a single panel with an image on it because rarely does a person stand inside a refrigeration cabinet of a supermarket or the like. There is, therefore, no need on the part of the person to look outwardly through the door and past the panel containing the image thereon. It is for this reason, panels with images on only one surface for refrigeration doors and the like have had some success but are of limited success because of the restrictions on the use of such panels.

It is desirable to use such transparent surfaces, such as windows of buildings, buses, streetcars, trucks and the like, as an advertisement medium or billboard support in order to display images of various types in order to maximize the advertising value of the use of such surfaces.

One-way vision display panels of the type which are constructed from plastic film material and which contain a printed image that is visible when viewed from one direction and which appears transparent when viewed from a second, opposite direction are known from the prior art. Such one-way vision display panels are advantageously used in advertising since they may be easily applied to and displayed on any smooth transparent surface, such as the windows of buildings, buses, streetcars, trucks and the like.

Published UK Patent Application GB 2 118 096 and U.S. Pat. No. 4,673,609 disclose similar one-way vision display panel assemblies which are fabricated from a plurality of glued together transparent plastic materials and which include a display image that is disposed at the interface of two transparent panels of the panel assemblies. In each of the above referenced designs the display image is visible when the panel assembly is viewed from one direction but is not seen when viewed from the opposite direction. In both designs the display image is formed as a pattern of two-color opaque dots which are applied by screen, litho or similar printing process at the panel interface. The opaque dots appear white or light in color on one side and black on the other. Light incident on the light color side of the panel is scattered and reflected thereby permitting an image formed by the dot pattern to be seen when viewed from this direction. Light incident on the opposite or black side of the panel is absorbed such that the light transmitted through the transparent portions of panel permit through-viewing in the direction from the black color side to the light color side. When applied to a bus window, the black color side faces the passenger while the light reflective color image side faces the outside.

A disadvantage with such dot pattern display panels as described above is that the visual clarity in the through-viewing direction of the display panel is not very good. The reason for this is that the multiple plastic and intermediate adhesive layers of the panel assembly cause undesirable light refraction and diffraction resulting in a dim and blurry grey tone when viewing the display panel in the through-viewing direction (i.e. in the direction from the darker side towards the image side).

A second disadvantage with such dot pattern display panels is that they are relatively stiff and inflexible due to their solid panel construction and thus are not suitable for application on surfaces having compound curvature since they will form wrinkles. Another disadvantage is that it requires an etching or washing process that diminishes color intensity.

It is also known in the art to fabricate a one way vision display panel from a metalized plastic film that is screen printed on one side and perforated with an ordered pattern of holes. The perforated metalized plastic film is then applied to an exterior surface of a window using either a double sided tape or spray adhesive. The ordered hole pattern, being arranged in straight grid-like columns and rows, provides only about a 37% open area for light transmission through the display panel. Also, the through-viewing clarity is adversely effected by the presence of glue or tape between the display panel and the window.

Accordingly, there is a definite need in the art for a one way vision display panel which allows a company to take advantage of the availability of public, transparent surface areas, such as window surfaces of buildings, vehicles and the like, and which overcomes the problems of the prior art.

SUMMARY OF THE INVENTION

Objects

The primary object of the present invention is to provide an improved one way vision display panel made up of a number of sandwiched panels which are bonded together and wherein one of the panels has an image which can be viewed when looking in one direction through the panel assembly but which cannot be observed when looking in the opposite direction through the panel assembly.

Another object of the present invention is to provide a display assembly of the type described wherein the assembly is suitable for mounting on display mediums such as windows, doors and the like having transparent panes or mounting surfaces so that an image can represent advertising materials which can be placed on the panels in a manner such that the view through the assembly of panels can be in one direction to view the advertising materials but such materials are blocked out when looking in the opposite direction.

Methods and apparatus which incorporate the features described below and which are effective to function as described above constitute specific objects of this invention.

The present invention is directed to a one way vision display panel assembly comprising a number of stacked panels, including a first panel provided with a light-reflective color image and second panel provided with a light-absorbing dark or black coating. The panels are stacked together before the image is placed on the first panel and the black or dark coating has been placed on the second panel. The panels are perforated with a plurality of through-holes which allow light transmission through the panel assembly. The holes can be placed through the panels either before or after they are assembled. Typically, the holes are formed after the panels have been assembled into the panel assembly.

The holes allow viewing through the panel assembly in one direction without seeing the image, yet the image can be viewed by looking at the panel assembly from the opposite direction.

A one-way vision display panel constructed as a perforated plastic panel assembly having a rear surface provided with a light-absorbing color coating (e.g. a black color coating) and a front surface provided with a light-reflective color image as described herein offers superior optical through-vision properties as compared to the conventional one-way vision display panels of the prior art as mentioned at the outset. The reason for this is that fewer optical losses due to diffraction and refraction are experienced when light is transmitted virtually unobstructed through the holes of the perforated panel assembly as compared to when light is transmitted through the numerous transparent plastic and adhesive layers and adhesive tape of the prior art one-way vision panels.

In accordance with the method aspects of the present invention, the display panel is constructed as a stacked assembly of individual plastic panel layers that are either extruded together, heat laminated together, glued together by intermediate adhesive layers or otherwise bonded together. The panel assembly may be adapted for either exterior or interior mount applications.

For the exterior mount embodiment, the light-reflective image panel and light-absorbing or black layer are bonded to opposite sides of an intermediate white opaque panel. A paper or other protective backing or liner can be adhered by a transfer adhesive layer to the remaining free surface of the light-absorbing layer. The panel assembly is then perforated with a plurality of through holes. The protective paper backing can then be peeled back to expose the underlying adhesive layer whereupon the panel assembly may be applied, sticky or black side down, to the exterior surface of the window. A substantially transparent panel or coating can be provided as a protective covering for the image layer.

For the interior mount embodiment, a transparent panel is coated on one side surface with a light-reflective color coating as a first layer and followed by an opaque (e.g., black) light-absorbing coating as a second layer. A paper or other protective backing or liner can be then adhered by a transfer adhesive layer to the remaining free side surface of the clear plastic panel. The panel assembly is then perforated with a plurality of through-holes. The protective backing can then be peeled back to expose the underlying adhesive layer whereupon the panel assembly may be applied, sticky or clear side down, to the interior surface of the window.

The panels of the assembly can be of tough, wear resistant materials, such as a heavy duty plastic sheet such as vinyl. Moreover, simple adhesives can be used for bonding the assembly of panels to windows of buildings, vehicles and the like. Alternatively, the various panels may be laminated together.

Various other combinations or variations of the panels can be used, if desired. For instance, additional transparent or clear plastic panels or coatings may be used as protective covers/coatings for the image and/or light-absorbing panels or layers. Also, one or more of the panels may comprise static cling material for direct adhesion to a window without need for an adhesive layer.

In one embodiment, the panel assembly may include a light-reflective layer which functions as a screen for receiving one or more projected images which can be projected thereon using well known projection techniques including, but not limited to, video, movie and slide projection techniques.

In one embodiment, the panel assembly may include a non-perforated one way mirror layer with the mirror side oriented towards the light reflecting direction, i.e. towards the image layer. The mirror layer provides security in that it prevents vision through the panel assembly in one direction. This embodiment may be used to provide building security. For example, the panel assembly may be placed on the windows of a kiosk or room within a casino or store. In such an environment, the panel assembly may be used to conceal hidden cameras or security personnel on the other side of the window.

In another alternative embodiment, the display panel assembly may comprise a single perforated membrane, preferably flexible plastic sheet material. The membrane is printed on one side with a light-reflective color image and printed or coated on a reverse side with a light-absorbing dark color coating.

In addition, the image layer may provide a three-dimensional effect by using known methods such as lenticular lens processes or hologram processes.

The present invention thus provides one-way viewing of images in a substantially unobstructed manner as a person views outwardly from the interior of the building or the vehicle. This phenomenon can be used for advertising purposes in as much as the surface areas of windows of buildings and vehicles can be utilized for displaying the images without impairing substantially the view of the person inside the building or the vehicle. The present invention can also be used on refrigerator and freezer glass doors in supermarkets.

Advantages

It is an advantageous feature of the present invention to perforate the panel assembly in accordance with a staggered hole pattern.

Another advantage of the invention is that the amount of light transmission and visibility through the panel assembly is increased from about 37% open area of the prior art to about 50% to 70% open area.

Another advantage of the invention is that the staggered hole pattern appears to the human eye as being more random and less discernible thereby enhancing the through- viewing feature of the panel assembly since distracting grid-like patterns are not readily detectible. Also, by eliminating the ordered vertical and horizontal lines of a conventional straight line hole pattern, the eye is less distracted when viewing the light-reflective color image side of the panel assembly, especially in situations where the color image itself contains straight lines which are coincident with the ordered rows and columns of the hole pattern.

Still another advantage of the invention is the resultant increase in the thickness of the web or bar portions disposed between the staggered holes. This provides increased tensile strength and improved resistance against shear. Thus, the panel assembly of the present invention can be installed on and removed from a window or other surface more easily without tearing than is currently possible with the one way vision display panel designs of the prior art.

Yet another advantage of the invention is that the perforated panel assembly is much more flexible than prior art display panel designs thereby enabling the display panel of the present invention to be stretched over and applied to surfaces having a compound curvature, such as for example a bubble shaped window, without wrinkling.

Other and further objects, advantages and benefits of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
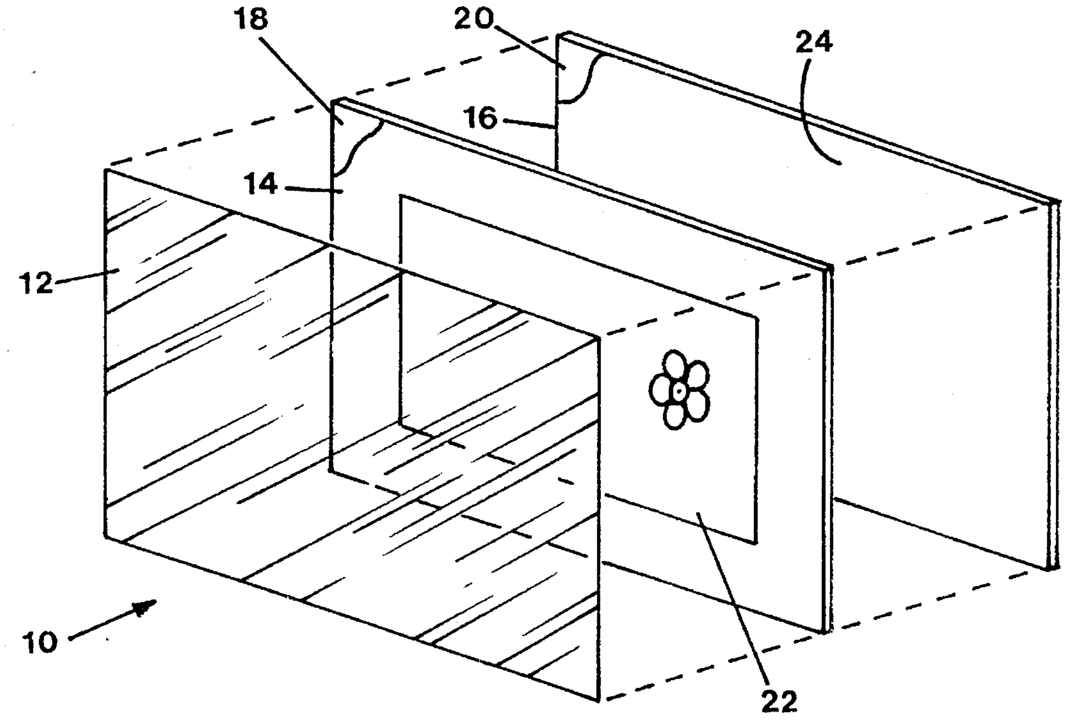
FIG. 1 is a perspective, exploded view of one embodiment of the one way vision display panel assembly of the present invention.

A one way vision display panel assembly constructed in accordance with one embodiment of the present invention is broadly denoted by the reference numeral 10 in FIGS. 1–4.

The display panel assembly 10 includes a first panel 12, a second panel 14, and a third panel 16. Panels 12, 14 and 16 comprise relatively thin, flexible sheet material including but not limited to transparent or translucent plastic sheet material with poly-vinyl chloride (PVC) sheet material being a preferred material. The panels 12, 14 and 16 are bonded together by some suitable bonding process, such as by heat lamination, co-extrusion, or by an adhesive, and preferably a clear adhesive.

As best seen in FIG. 1, an adhesive layer 18 bonds panels 12 and 14 together, and an adhesive layer 20 bonds panels 14 and 16 together. The panels can be of any shape, such as rectangular, as shown in FIG. 1. However, they can be of circular, hexagonal, square or other shapes as desired.

The panels 12, 14, and 16, when bound together by the adhesive layers 18 and 20, form the composite or panel assembly 10 in which the panel 14 is disposed between panels 12 and 16.

Panel 12 is preferably transparent or clear in the sense that it has no coating thereon which blocks the passage of light through panel 12.

Panel 14 has an image 22 of an object, such as a flower (as shown), which is printed or otherwise applied to one face of panel 14. For purposes of illustration, image 22 is applied to the side facing panel 12. Moreover, the image 22 preferably comprises a coating of colored inks or dyes which reflect incident light in order to create a desired visual impression. The image 22 may be applied by laser inking process, an image transfer process or by a silk screen, litho or similar ink printing process. The transparent panel 12 forms a protective layer or cover for the image 22 on the panel 14. The transparent panel 12 also preferably includes ultra violet (UV) protective properties to help prevent against sun damage to the inks or dyes which form the image 22.

In another embodiment, panel 12 comprises a coating.

Panel 16 has an opaque light-absorbing or dark coating 24 thereon, such as a coating of black paint. The black or dark coating 24 covers the entire surface of panel 16.

Figure 2:
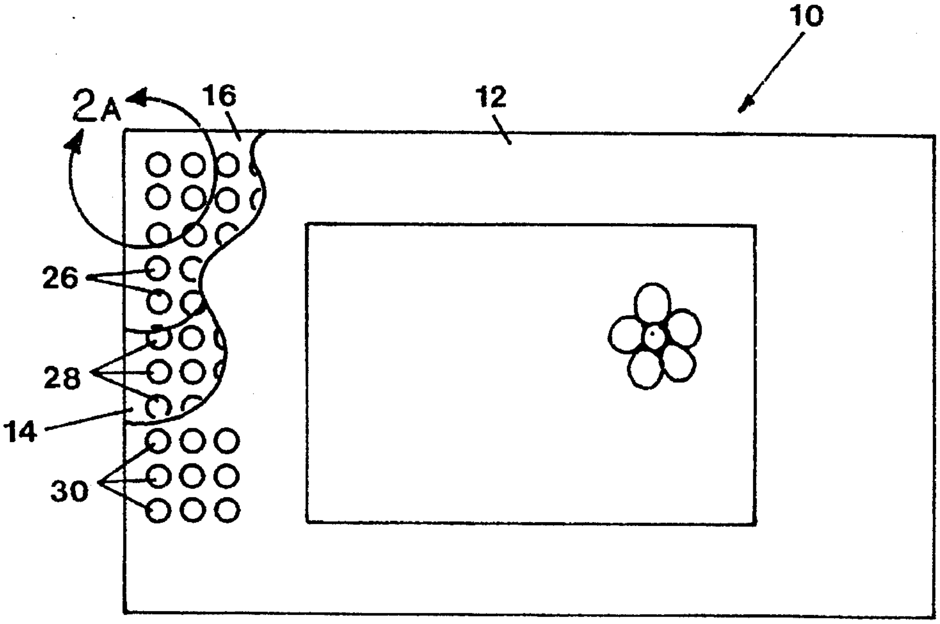
FIG. 2 is a front elevational view of the one way vision display panel assembly (in assembled form) of the embodiment of FIG. 1.

Each of the panels 12, 14 and 16 (and intermediate adhesive layers 18 and 20) of the display panel assembly 10 is perforated with a plurality of holes. As shown in FIG. 2, holes 26 are provided in panel 16, holes 28 are provided in panel 14, and holes 30 are provided in panel 12. Coordinate holes 26, 28 and 30 of the respective panels 12, 14 and 16 are aligned with each other to form continuous light passages or through-holes through the formed display panel assembly 10.

There are many different holes in the assembly of panels. For instance, there could be 200–400 holes per square inch of panel space. The size of the holes is preferably on the order of 0.001 inch to 1.0 inch or larger.

Figure 2A:
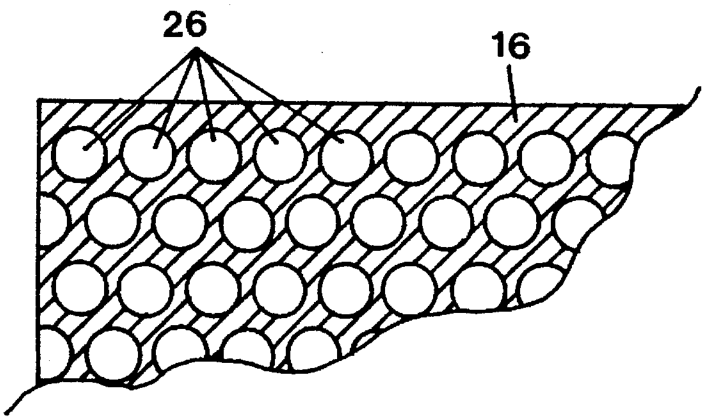
FIG. 2A is an enlarged view of the encircled region of one of the perforated panel layers shown in FIG. 2 showing the perforations arranged in a staggered hole pattern.

FIG. 2A is an enlarged view of the encircled region of panel 16 shown in FIG. 2 showing the perforations (in this case holes 26) arranged in a staggered hole pattern. The staggered hole pattern of the present invention offers many advantages including:

(1) an increase in the amount of light transmission and visibility through the display panel assembly from about 37% open area of the prior art to about 50% to 70% open area;

(2) a more pleasing psychological impression as compared to the grid-like hole patterns of the prior art as the staggered hole pattern of the present invention appears to the human eye as being more random and less discernible thereby enhancing and facilitating the through-viewing feature of the panel assembly; and (3) an increase in the thickness of the web or bar portions disposed between the staggered holes which increases the tensile strength of the panel assembly and improves resistance to shear by eliminating ordered and continuous tear lines.

Figure 2B:
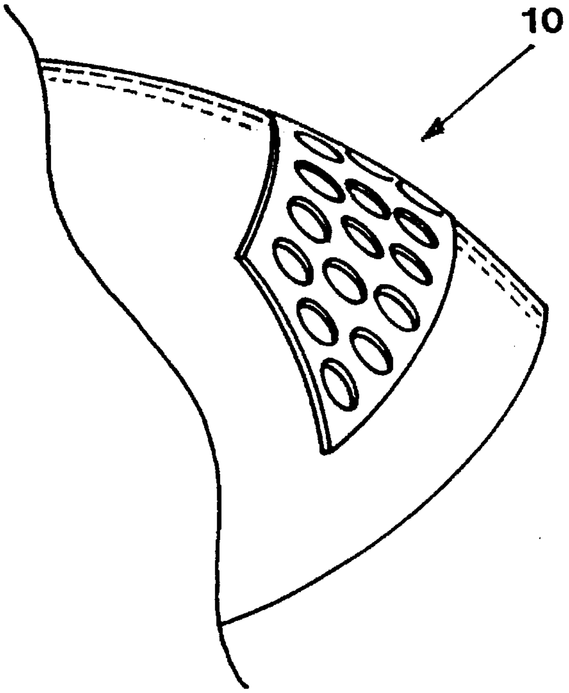
FIG. 2B is a perspective view illustrating how the staggered hole pattern enables the one way vision display panel assembly to conform to a surface having a compound curvature.

Another advantage of the staggered hole pattern of the present invention, is that the staggered hole pattern enables the display panel assembly 10 to conform to surfaces of a display medium (e.g. a window) having compound curvature without wrinkling. This is best seen with reference to FIG. 2B.

In accordance with the method of fabrication of the invention, the panels are arranged separately from each other and the image 22 is applied to panel 14 while the opaque light-absorbing coating 24 is applied to panel 16. The panels are then bonded to each other by the various adhesive layers 18 and 20, respectively, to form the assembly 10 as shown in FIG. 2. The perforations or through-holes are preferably made after the various panels have been glued or otherwise laminated together.

Figure 3:
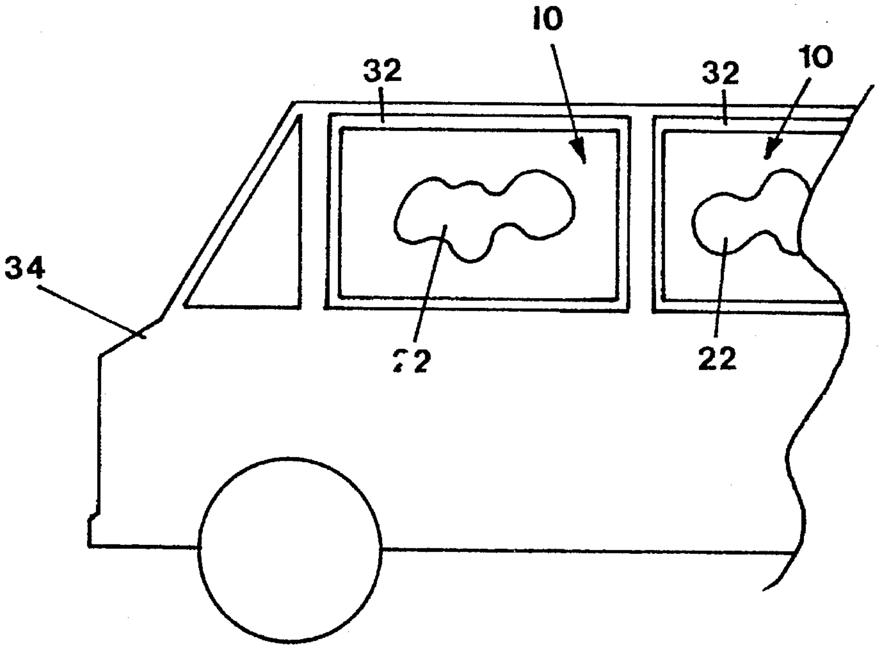
FIG. 3 is a side elevational view of the display panel assembly of FIGS. 1 and 2 shown being applied to a vehicle window to illustrate details of use.
Figure 4:
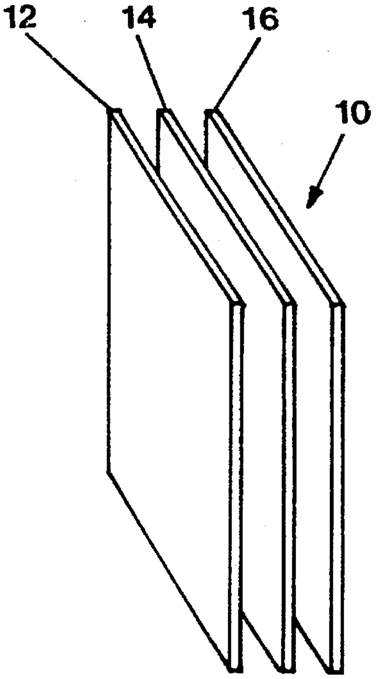
FIG. 4 is a perspective view of another embodiment of the display panel assembly of the present invention.

As one embodiment, the display panel assembly 10 is applied to the outside surface of a window 32 of a bus 34 or other vehicle (see eg. FIG. 3). In this example, the transparent panel 12 is at the outermost side of the display panel assembly 10 and the innermost surface of panel 16 will be secured by an adhesive (not shown) to the exterior surface of window 32.

Alternatively, any or all of the panels 12, 14 and 16 may comprise self-adhesive or static cling film, such as, for example, poly-vinyl chloride sheet material, such that the completed panel assembly may be removably applied to a surface (i.e. inside or outside surface) of a window 32.

To passengers seated inside the bus 34, the display panel assembly 10 appears transparent as the perforations or through-holes permit the transmission of light therethrough without significant reflection. Thus persons inside the bus 34 typically will not notice the presence of the display panel assemblies 10 on the bus windows 32.

A person outside the bus 34, however, will clearly see the image embodied in the image layer 22 when looking at the display panel assemblies 10 on the bus windows 32 as the light incident on the color surface of the image layer 22 will be reflected. The reason for this is that the image layer 22 will be contiguous with a black dark background 24 of panel 16 and the person will not have a perception of looking through the holes 26, 28, and 30 of the panels 12, 14 and 16, respectively, of the display panel assembly 10 because of the prominence of the dark background surrounding the image layer 22. In effect, therefore, the image is seen looking in only one direction, namely in the direction toward panel 16 from panel 12. In such a case, the image is observable and this image can be used for advertising and other purposes.

Figure 5:
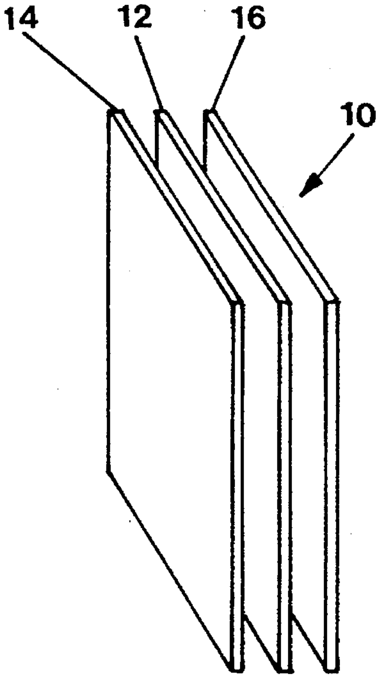
FIG. 5 is a perspective view similar to FIG. 4 but showing another embodiment of the display panel assembly of the present invention with a slightly different orientation of the panels with respect to each other.

FIG. 5 shows an alternate embodiment of the three panel assembly 10' wherein the positioning of the transparent panel 12 and the image-coated panel 12 are reversed.

FIGS. 6–10 show a number of alternate embodiments of the present invention.

Figure 6:
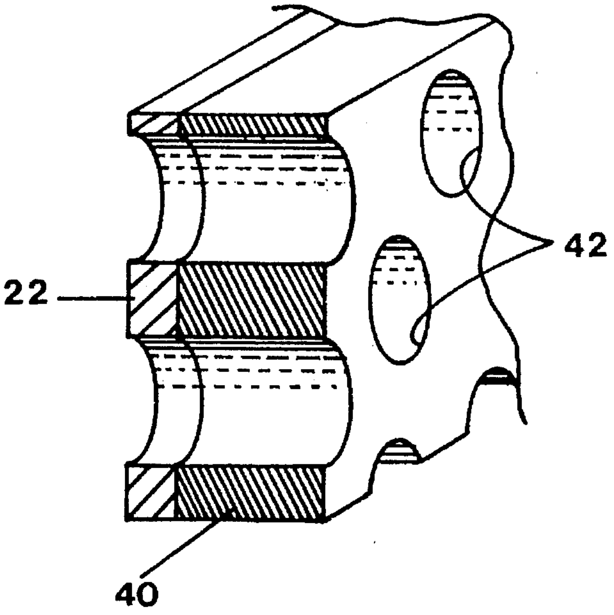
FIG. 6 is a fragmentary perspective view, on an enlarged scale, of a single panel with an image layer coated on one face thereof.

In FIG. 6, the display panel assembly comprises a single plastic panel or membrane 40 which is opaque black in color. The panel 40 has a light-reflective color coating 22 forming an image layer along one side surface thereof. The black panel 40 is perforated with plural through-holes 42 of some suitable sort. The through-holes 42 extend completely through the black panel 40 and the image coating 22. The through-holes 42 are cylindrical and can be formed either before or after the image coating 22 is applied to the black panel 40. The through-holes 42 permit light to be transmitted through the panel assembly. Since the through-holes 42 extend completely through the entire panel assembly, there are no glue or plastic layers which will contribute to undesirable refraction or diffraction as light is transmitted therethrough resulting in improved optical performance. This is especially beneficial where the display panel assembly is to be adhered to a window, since the additional glass layer of the window compounds the problem of controlling undesirable light refraction and diffraction when looking through both the panel assembly and the window.

FIGS. 6A–6B and 6C–6D illustrate examples of two interior mount embodiments of the display panel assembly of the present invention.

Figure 6A:
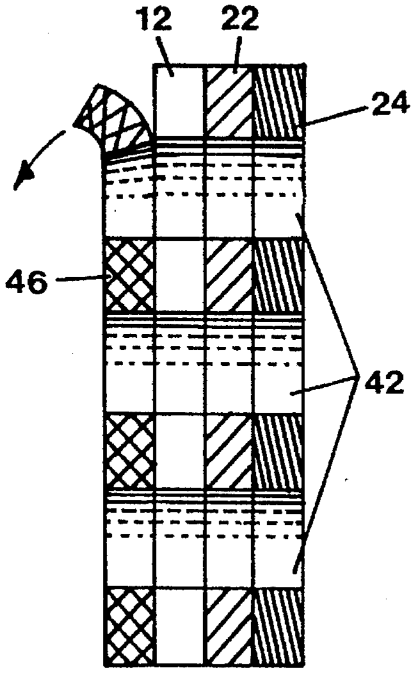
FIGS. 6A–6B shows a series of cross-sectional views of one alternate embodiment of the one way vision display panel assembly of the present invention which includes a release liner or backing layer (FIG. 6A) which when peeled-off exposes an underlying transparent static cling panel layer adapted for adhering the display panel assembly to a window (FIG. 6B)
Figure 6B:
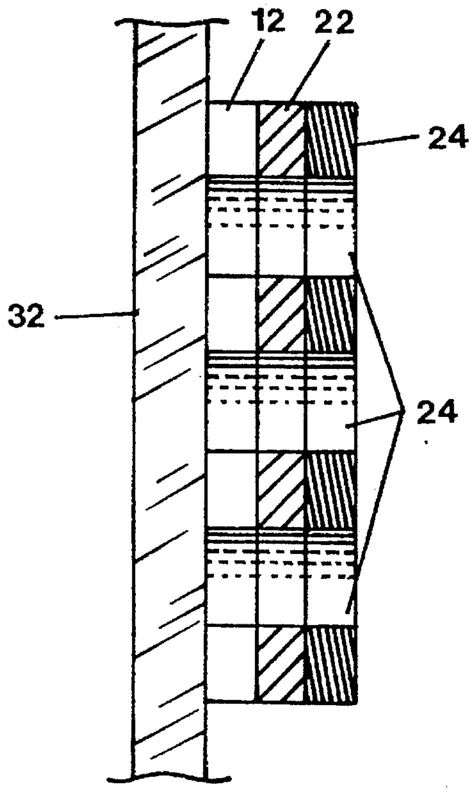

FIG. 6A shows a display panel assembly comprising a single transparent panel 12. The transparent panel 12 has a light-reflective color image coating or layer 22 applied to or printed on one side surface thereof followed by an opaque light-absorbing color coating) or layer 24 (e.g. black paint). The transparent layer 12 can comprise a static cling material layer. A peel-off liner or backing 46 can be laminated or otherwise applied to layer 12 as shown. As before, the entire assembly is perforated with through-holes 42. FIG. 6B shows the embodiment of FIG. 6A with the peel-off liner 46 removed and the assembly mounted to a window 32.

Figure 6C:
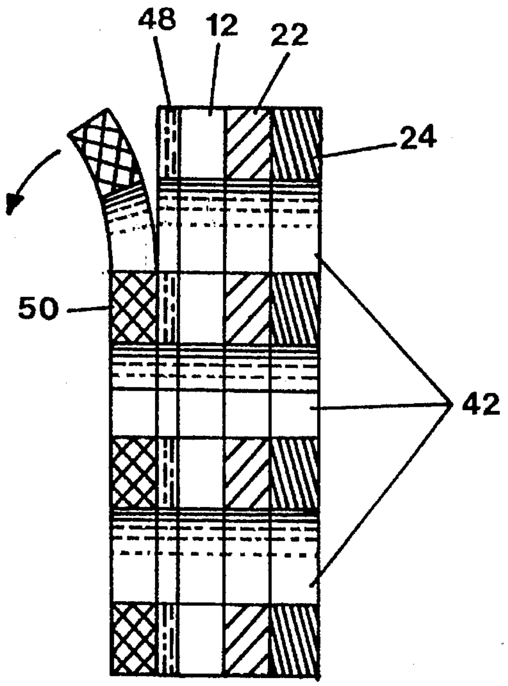
FIGS. 6C–6D shows a series of cross-sectional views of another alternate embodiment of the one way vision display panel assembly of the present invention which includes a release liner or backing layer (FIG. 6C) which, when peeled-off, exposes an underlying transparent adhesive layer adapted for adhering the display panel assembly to a window (FIG. 6D)
Figure 6D:
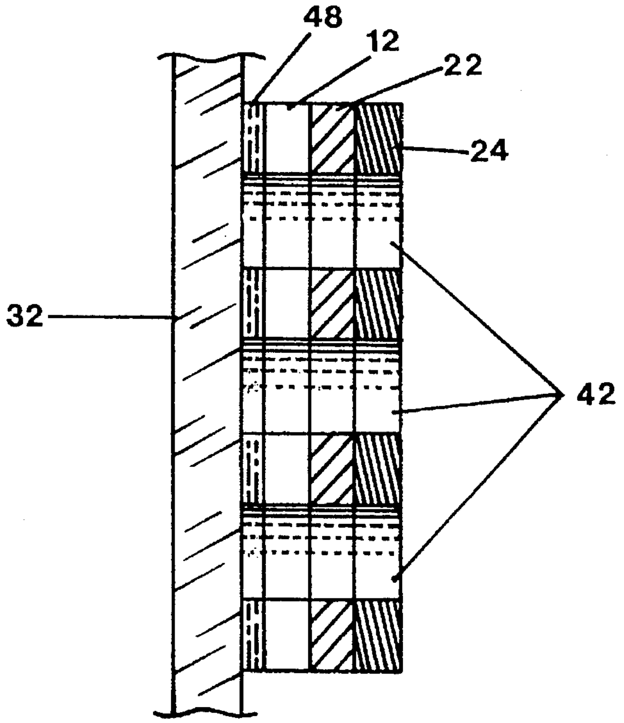

FIG. 6C shows a display panel assembly comprising a single transparent panel 12 similar to the embodiment of FIGS. 6A–6B. As before, the panel 12 has a light-reflective color image coating or layer 22 applied to one side surface (i.e the right side thereof) followed by an opaque light-absorbing color coating or layer 24. A transfer adhesive 48 and peel-off liner (e.g. a paper backing) 50 are applied to the remaining free side surface (in this case the left side surface) of the transparent panel 12. The entire assembly is perforated with through-holes 42. FIG. 6D shows the embodiment of FIG. 6C with the peel-off liner 50 removed and the assembly mounted to a window 32.

In the two interior mount embodiments of FIGS. 6A–6B and 6C–6D, the image contained in the image coating or layer 22 is visible when the display panel assembly is viewed from outside the window 32 in a direction through the window 32 and transparent panel 12 towards the image coating or layer 22. The display panel assembly appears transparent when viewed from the opposite direction (i.e. from inside the window. That is, a person on the right side of the panel assembly may see through the panel assembly with virtually no noticeable obstruction.

In addition, a non-perforated backing layer (not shown) may be applied to the perforated backing layers 46 and 50 as shown in the embodiments of FIGS. 6A & 6C to facilitate handling of the panel assembly during fabrication of the panel assembly.

Figure 7:
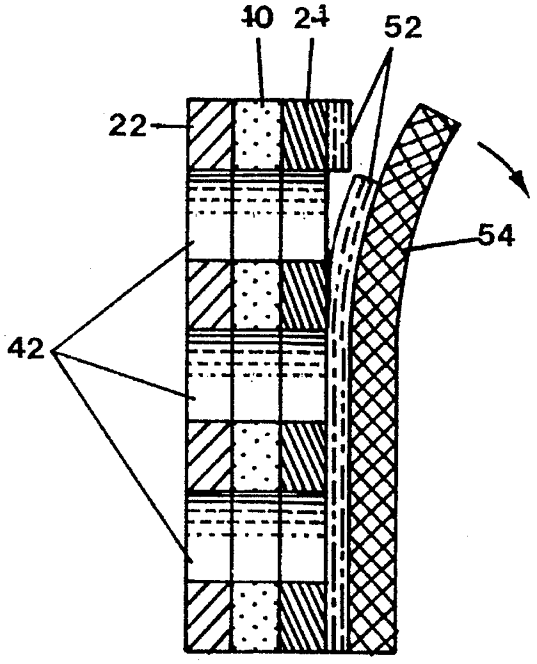
FIGS. 7 and 8 are cross-sectional views through other embodiments of the present invention similar to FIGS. 6A–6D but showing the inclusion of a non-perforated transfer adhesive and associated backing or release liner.

FIG. 7 shows an example of an exterior mount embodiment comprising an opaque white panel 40 having opposed flat faces with an image coating 22 on one face and an opaque light-absorbing color coating 24 on the opposite face. Coating 24 may also comprise a light-absorbing material layer. As shown in FIG. 7, an optional transfer adhesive layer 52 and non perforated peel-off protective liner 54 may be applied to an exposed side surface of the assembly (in this case the light-absorbing color coating or layer 24). The protective liner 54 facilitates handling of the assembly before it is applied to a display medium (eg. a window).

It is important to note that when the protective liner 54 is removed, those portions of the adhesive layer 52 which overlie the through-holes 42 are also carried away along with the liner 54 so that the clarity of vision through the display panel assembly in the through-viewing direction (i.e. from right to left) is not impaired.

Figure 8:
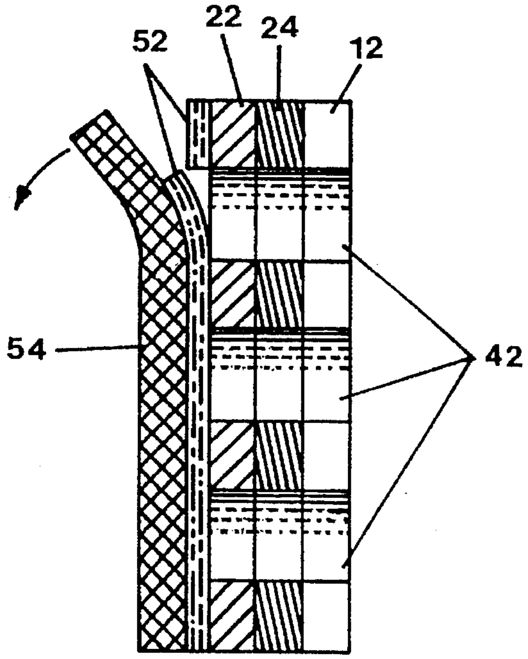

FIG. 8 shows a view similar to FIG. 7 but showing the through-holes 42 in the assembly with the image layer 22 being on the outer face of the light-absorbing or darkened layer 24. In this embodiment, the panel 12 is preferably transparent.

In all cases with respect to the embodiments shown in FIGS. 6–8, a person looking in the through-viewing direction (i.e. from right to left) will not see the image on the image coating or layer 22 but will see the field of view to the left of the assembly by looking through the through-holes 42. On the other hand, a person looking from left to right in each of the embodiments illustrated in FIGS. 6–8, will view the image on the image coating or layer 22.

Figure 9:
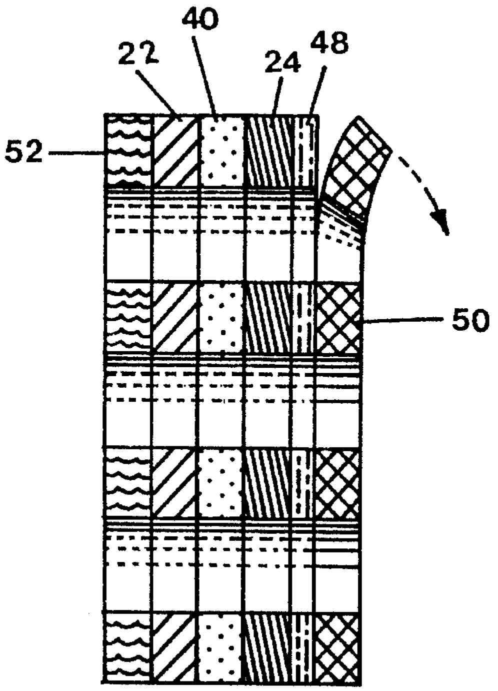
FIG. 9 is a cross-sectional view through another embodiment of the invention similar to that shown in FIGS. 6C–6D but showing the adhesive-backed release liner or backing layer on the opposite side surface of the panel assembly.

FIG. 9 shows another embodiment of the invention which is adapted for exterior mount applications and which includes a outer transparent protective layer 52 provided to the image coating 22. The outer transparent layer 52 preferably has ultra violet (UV) protective properties to protect the inks and dyes of the image coating 22 from color degradation due to prolonged exposure to sunlight.

Figure 10:
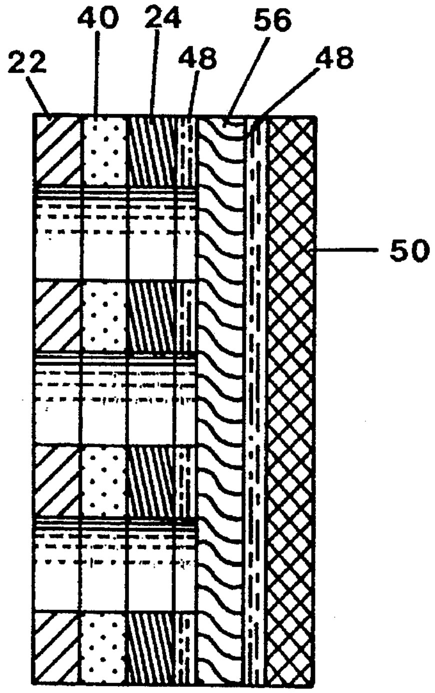
FIG. 10 is a cross-sectional view through another embodiment of the invention similar to that shown in FIG. 9 and further including a non-perforated mirror layer.

FIG. 10 shows another embodiment of the invention similar to that shown in FIG. 9 but which includes a non-perforated one way mirror layer 56. In this embodiment, the mirror side of the one way mirror layer 56 is oriented towards the light reflecting direction, i.e. towards the image coating 22. The mirror layer 56 provides security in that it prevents vision through the display panel assembly in one direction. This embodiment may be used to provide building security such as by placement on the windows of a kiosk or room within a casino or store. In such an environment, the display panel assembly may be used to shield from public view hidden cameras or security personnel which are monitoring the events that occur within the casino or store. Alternatively, the one way mirror layer 56 can also be incorporated within other panel assembly embodiments such as those disclosed herein as desired.

It should be understood that various modifications within the scope of this invention can be made by one of ordinary skill in the art without departing from the spirit thereof. We therefore wish my invention to be defined by the scope of the appended claims as broadly as the prior art will permit, and in view of the specification if need be.

What is claimed is:

1. A one way vision display panel assembly specially constructed for pressure sensitive application onto a window of a building or vehicle, said one way vision display panel assembly comprising:

a) a perforated panel assembly including:
   - i) a perforated transparent panel formed of a flexible plastic sheet material having a front surface and a rear surface;
   - ii) a perforated protective liner;
   - iii) pressure sensitive adhering means disposed between said front surface of said perforated transparent panel and said perforated protective liner for removably adhering said perforated transparent panel to said perforated protective liner so that said perforated protective liner can be peeled off from said perforated transparent panel to permit pressure sensitive application of said perforated transparent panel to a clear substrate;

b) said rear surface of said perforated transparent panel having applied thereon a first coating of light-reflective color bearing an image followed by a second coating of an opaque color sufficiently dark for absorbing light, wherein:
   - i) said perforated panel assembly appears substantially transparent when viewed from a first direction;
   - ii) said image is clearly visible when said perforated panel assembly is viewed from a second, opposite direction; and c) a non perforated backing layer removably attached to said perforated protective liner, wherein said non perforated backing layer being effective to facilitate handling of said perforated panel assembly.

2. A one way vision display panel assembly according to claim 1 which includes a non perforated mirror film layer disposed between said perforated protective liner and said non perforated backing layer.

3. A one way vision display panel assembly according to claim 1 wherein said non perforated backing layer comprises mirror film material.

4. A one way vision display panel assembly according to claim 1 wherein:

a) the perforated panel assembly is provided with through-holes of a substantially uniform hole size in a range of about 0.001" to 1.0"; and b) said though-holes are arranged in a staggered hole pattern to provide an open area in a range of about 40% to 70% and to permit the perforated panel assembly to conform to compound curved surfaces of a clear substrate without wrinkling.

5. A one way vision display panel assembly according to claim 1 wherein said pressure sensitive adhering means comprises static cling properties provided to said perforated transparent panel.

6. A one way vision display panel assembly according to claim 1 wherein said pressure sensitive adhering means comprises a layer of perforated transfer adhesive material.

7. A one way vision display panel assembly according to claim 1 wherein said perforated transparent panel has ultra violet (UV) protective properties.

* * * * *